(12) United States Patent
Boal

(10) Patent No.: US 10,937,015 B2
(45) Date of Patent: Mar. 2, 2021

(54) PRE-PAID PAYMENT INSTRUMENT PROCESSING

(71) Applicant: Cashstar, Inc., Waltham, MA (US)

(72) Inventor: Steven R. Boal, Westford, MA (US)

(73) Assignee: CASHSTAR, INC., Portland, ME (US)

( * ) Notice: Subject to any disclaimer, the term of this patent is extended or adjusted under 35 U.S.C. 154(b) by 112 days.

(21) Appl. No.: 15/938,619

(22) Filed: Mar. 28, 2018

(65) Prior Publication Data

US 2018/0218353 A1 Aug. 2, 2018

Related U.S. Application Data

(60) Continuation of application No. 14/480,792, filed on Sep. 9, 2014, now abandoned, which is a continuation of application No. 14/054,230, filed on Oct. 15, 2013, now Pat. No. 8,874,481, which is a continuation of application No. 13/803,599, filed on Mar. 14, 2013, now Pat. No. 8,589,296, which is a division of
(Continued)

(51) Int. Cl.

| | |
|---|---|
| *G06Q 20/28* | (2012.01) |
| *G06Q 20/06* | (2012.01) |
| *G06Q 20/10* | (2012.01) |
| *G06Q 20/34* | (2012.01) |
| *G06Q 20/36* | (2012.01) |
| *G06Q 20/30* | (2012.01) |
| *G06Q 20/40* | (2012.01) |

(52) U.S. Cl.
CPC ......... *G06Q 20/28* (2013.01); *G06Q 20/0652* (2013.01); *G06Q 20/10* (2013.01); *G06Q 20/30* (2013.01); *G06Q 20/349* (2013.01); *G06Q 20/3552* (2013.01); *G06Q 20/363* (2013.01); *G06Q 20/40* (2013.01)

(58) Field of Classification Search
USPC ...................................................... 705/34–45
See application file for complete search history.

(56) References Cited

U.S. PATENT DOCUMENTS

| 5,557,516 | A | 9/1996 | Hogan | |
|---|---|---|---|---|
| 6,615,189 | B1 * | 9/2003 | Phillips | G06Q 20/10 705/14.34 |

(Continued)

FOREIGN PATENT DOCUMENTS

| JP | 3290454 B2 * | 6/2002 |
|---|---|---|
| KR | 20010000053 A | 1/2001 |

(Continued)

OTHER PUBLICATIONS

Gilgoff, H., "A Bank's Gift Cards Cost Extra," Newsday (Nassau and Suffolk edition), Long Island, New York, p. A. 66 (Dec. 4, 2005).

(Continued)

*Primary Examiner* — William E Rankins
(74) *Attorney, Agent, or Firm* — Panitch Schwarze Belisario & Nadel LLP

(57) ABSTRACT

Methods, systems, and apparatus, including computer program products, in which a method includes attributing a value to a pre-paid payment instrument, determining an expiration time associated with the pre-paid payment instrument, and automatically return an un-used portion of value associated with the pre-paid payment instrument at the expiration time to the purchaser.

12 Claims, 6 Drawing Sheets

Related U.S. Application Data application No. 11/946,748, filed on Nov. 28, 2007, now Pat. No. 8,452,705.

(56) References Cited

U.S. PATENT DOCUMENTS

| | | |
|---|---|---|
| 6,793,135 B1 | 9/2004 | Ryoo |
| 7,177,838 B1 | 2/2007 | Ling |
| 7,249,099 B2 | 7/2007 | Ling |
| 7,328,189 B2 | 2/2008 | Ling |
| 7,376,621 B1 | 5/2008 | Ling |
| 7,600,674 B1 | 10/2009 | Marah et al. |
| 7,711,620 B2 | 5/2010 | Abifaker |
| 7,953,654 B2 | 5/2011 | Abifaker |
| 8,200,544 B1 | 6/2012 | Jones et al. |
| 8,396,772 B2 | 3/2013 | Abifaker |
| 8,521,629 B2 | 8/2013 | Abifaker |
| 8,554,655 B2 | 10/2013 | Abifaker |
| 8,655,762 B2 | 2/2014 | Abifaker |
| 2002/0047044 A1 | 4/2002 | Orus et al. |
| 2002/0120563 A1* | 8/2002 | McWilliam ............ G06Q 20/04 705/39 |
| 2002/0133424 A1 | 9/2002 | Joao |
| 2002/0194124 A1* | 12/2002 | Hobbs .................... G06Q 20/10 705/39 |
| 2003/0065624 A1 | 4/2003 | James et al. |
| 2004/0011866 A1 | 1/2004 | Saad |
| 2004/0169722 A1 | 9/2004 | Pena |
| 2005/0097042 A1 | 5/2005 | Phillips et al. |
| 2005/0199712 A1* | 9/2005 | Rosenblatt .......... G06Q 20/102 235/381 |
| 2005/0269402 A1* | 12/2005 | Spitzer .................. G06Q 20/04 235/380 |
| 2006/0100927 A1 | 5/2006 | Lormati |
| 2007/0108268 A1 | 5/2007 | Graves et al. |
| 2007/0108270 A1* | 5/2007 | Bjoraker ................ G06Q 40/00 235/380 |

FOREIGN PATENT DOCUMENTS

| | | |
|---|---|---|
| KR | 20010100653 A | 11/2001 |
| KR | 20020004010 A | 1/2002 |
| WO | 2009073451 A2 | 6/2009 |

OTHER PUBLICATIONS

Higgins, M., "Short on Gift Ideas? . . . Think Plastic," Wall Street Journal (Eastern edition), New York, New York, p. D2 (Nov. 13, 2002).

Int'l Search Report and Written Opinion dated May 29, 2009 in Int'l Application No. PCT/US2008/084573.

* cited by examiner

PRE-PAID PAYMENT INSTRUMENT PROCESSING

BACKGROUND

This document relates to payment instruments.

Hard currency is but one form of payment that can be used in value transactions. Various forms of pre-paid payment instruments, pre-paid value cards, coupons and the like have been used to facilitate transactions, including web-based and brick and mortar transactions. Conventional pre-paid payment mechanisms are typically acquired by a purchaser for value from a seller. The seller can be a re-seller, a bank or other financial institution, a retailer, or other entity. The purchaser typically provides value (e.g., money) to the seller and is issued (e.g., by printing or otherwise associating the value with the pre-paid payment instrument) the pre-paid payment instrument. The pre-paid payment instrument can be of the form of a pre-paid gift or value card, a coupon, or other value mechanism. Conventionally, once the seller completes the initial transaction of selling and providing the pre-paid payment instrument to the purchaser, no further interactions with the purchaser are required. That is, while the seller will track purchases against value attributed to the pre-paid payment instrument, no further interaction with the purchaser occurs. One of the attractions for issuers of the pre-paid payment instruments is the redemption rate associated with the instruments. Typically, less than 100 percent of the value of the pre-paid payment instruments are ever redeemed. The pre-paid payment instruments can be lost or left un-spent, resulting in a value proposition that favors the seller.

SUMMARY

In general, one aspect of the subject matter described in this specification can be embodied in methods that include the actions of receiving, from a sending party, value and associating the value with a payment instrument; issuing the payment instrument having the associated value; determining if the value has been used prior to the expiration of a predetermined period of time; and if value remains on the payment instrument at the time of expiration, automatically returning the unused value to the sending party.

Aspects of the invention can include none, one or more of the following features. The value can be a monetary value. The payment instrument can be a coupon or a pre-paid value card. The action of issuing the payment instrument can include printing the payment instrument on a computer associated with the sending party or a receiving party. The action of determining if the value has been used can include determining if a receiving party of the payment instrument has expended all of the value in one or more transactions prior to the expiration date. The expiration date can be predetermined (e.g., 3 months from last use of the instrument). Alternatively, the actions can include setting the expiration date by the sending party. The action of returning the unused portion of value can include returning the unused portion to the sending party less a restocking fee.

In another aspect a method of providing a pre-paid payment mechanism to a purchaser is provided. The method includes receiving payment from a purchaser for a pre-paid payment mechanism; associating a value to the pre-paid payment mechanism, the value attributable to the payment; issuing the pre-paid payment mechanism to the purchaser; and determining if a pre-determined time has expired associated with the pre-paid payment mechanism. If the pre-determined time has expired, the method includes determining if a portion of the value remains associated with the pre-paid payment mechanism and if a portion of value remains, automatically returning the portion of value to the purchaser.

Aspects of the invention can include none, one or more of the following features. The method can further include, if a portion of value is returned to the purchaser, invalidating the pre-paid payment mechanism.

In another aspect a system is provided that includes a payment processor for receiving payments for pre-paid payment mechanisms; an issue engine for issuing pre-paid payment mechanisms to purchasers; a tracking engine operable to determine a time of issuance for each pre-paid payment mechanism and a time of expiration of same; and a redemption engine operable to automatically return unused value to purchasers of pre-paid payment instruments at a time of expiration of same.

Aspects of the invention can include none, one or more of the following features. The payment processor can be operable to receive payment from a purchaser for the pre-payment mechanism. The issue engine can be operable to issue a pre-paid value instrument to the purchaser or a designated recipient upon successful processing of a payment by the payment processor. The tracking engine can be operable to track purchases made with the pre-paid payment mechanism prior to the expiration time. The system can further include a pre-payment index operable to retain a value that is associated with a given pre-paid payment mechanism at a given time. The index can be of the form of a database. The payment processor, issue engine, tracking engine and redemption engine can be included in a server portion of the system. The system can further include a client portion, the client portion operable to receive the pre-paid payment mechanism from the server portion and print the pre-paid payment mechanism for use by the purchaser.

In another aspect a pre-paid value issuer is provided. The pre-paid value issuer includes means for attributing a received payment to a pre-paid value mechanism; means for determining if the pre-paid value mechanism has expired; and means for automatically returning an un-used value portion of the pre-paid value mechanism to a purchaser at an expiration time associated with the pre-paid value mechanism.

Aspects of the invention can include none, one or more of the following features. The pre-paid value issuer can further include means for issuing the pre-paid value mechanism to a purchaser; means for tracking purchases associated with the pre-paid value mechanism; and means for tracking remaining value associated with the pre-paid value mechanism.

In another aspect, a computer program product embodied in a tangible media including instructions included thereon for causing a processor is provided. The instructions can include instructions to attribute a value to a pre-paid payment instrument; determine an expiration time associated with the pre-paid payment instrument; and automatically return an un-used portion of value associated with the pre-paid payment instrument at the expiration time.

Aspects of the invention can include none, one or more of the following features. The computer program product can further include instructions for issuing the pre-paid payment instrument to a party providing the value, instructions for printing the pre-paid instrument for a party providing the value and instructions for automatically crediting an account associated with a party providing the value for the un-used portion at the expiration time.

Optional advantages and features that can be realized by the subject matter described in this specification can include a more optimum pre-paid payment mechanism that can be fully valued irrespective of whether the end instrument is presented or not to an entity for redemption. Purchasers of pre-paid payment instruments can receive full-value for purchases each time irrespective of the redemption of the pre-paid payment instruments. In some implementations, purchasers receive near-full value, which equates to the full value less a re-stocking fee for performing the automatic credit service at the time of expiration.

These various optional advantages and features can be separately realized and need not be present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
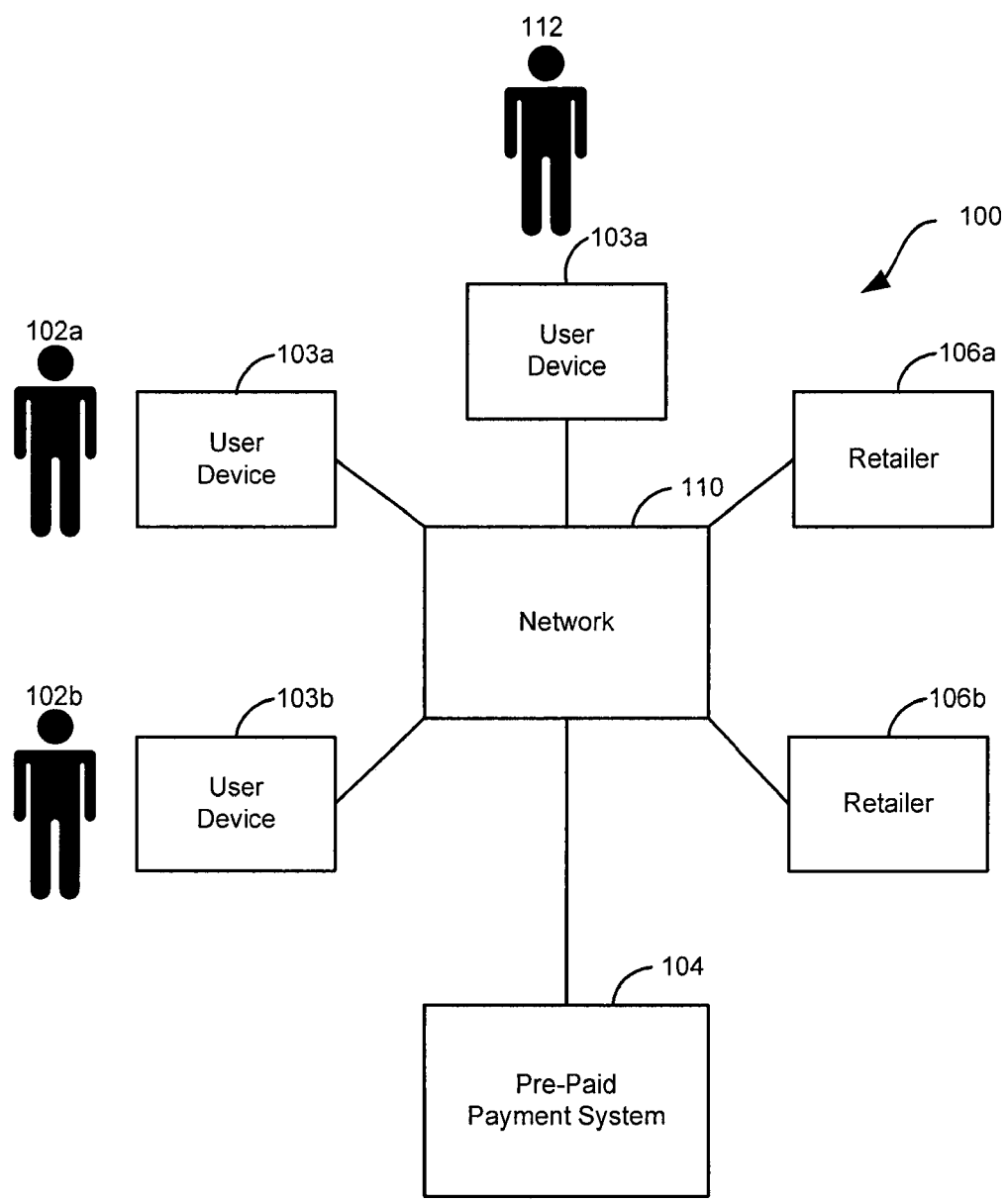
FIG. 1 is a block diagram of an example online environment.

FIG. 1 is a block diagram of an example online environment 100. The online environment 100 can facilitate the purchase of pre-paid payment mechanisms by users. A computer network 110, such as a local area network (LAN), wide area network (WAN), the Internet, or a combination thereof, connects purchasers 102a and 102b by way of user devices 103a and 103b, a pre-paid payment system 104, retailers 106a and 106b and designated recipients by way of user device 103c. Although only two purchasers (102a and 102b), one recipient (112), three user devices (103a-c) and two retailers (106a and 106b) are shown, the online environment 100 may include many (e.g., thousands) of purchasers, recipients, user devices and retailers. The network 110 can communicate with other networks, both public and private, such as a public switched telephone network (PSTN) and/or a cellular network as well as with other payment systems (e.g., other back end payment systems between the pre-paid payment system 104 and the retailers 106). As will be described in detail below, the pre-paid payment system 104 can associate a value with a pre-paid payment instrument, issue the instrument and track value remaining. Further, the pre-paid payment system 104 can monitor un-used value on a given pre-paid payment instrument and automatically return un-used value to a purchaser at a predetermined expiration time. While reference is made to an online environment, the methods, systems and computer program products disclosed can be implemented in other environments, including those that do not include an on-line presence or client-server configurations and the like.

In some implementations, one or more purchasers 102a and/or 102b can directly, or indirectly, purchase, maintain, and track value associated with a pre-paid payment instrument by way of respective user devices 103. Similarly, a designated recipient 112 can be provided the pre-paid payment instrument by way of user device 103c. User devices 103 can be of the form of a desktop of portable computer, a personal digital assistant, a telephone, a set-top box, a dumb terminal, a portable electronic device, a blackberry, a messaging device, a cellular telephone, a card reader, or other device for facilitating the communication between the purchaser(s) 102 and the pre-paid payment system 104. The pre-paid payment instrument can be of the form of a monetary instrument or mechanism, a coupon (e.g., to be printed out and delivered to the purchaser or a designated recipient using the device 103), a gift card, a pre-paid value card, a pre-paid telephone card, a pre-paid voucher, or other tangible form of value. In one implementation, the coupon is "redeemable for cash" and has an associated bearer or pin number that is required to be used in a transaction. In one implementation, the coupon can be printed using a web browser on a standard personal computer by either the purchaser or a designated recipient.

Purchasers 102 can provide value to the pre-paid payment system 104 by any form of payment including direct payment, transfers from a financial account, credit card payment, check, electronic check, etc. Purchasers can receive the pre-paid payment instrument or designate delivery to a recipient (e.g., designated recipient 112). If a designated recipient is identified, the pre-paid payment system 104 can facilitate communication with the recipient 112 as well as notifications to the purchaser 102 as desired (e.g., at the time of receipt, time of printing, time of expiration, use, etc.).

In some implementations, pre-paid payment system 104 operates to receive value from a purchaser, associate value with a pre-paid instrument, issue the pre-paid instrument (e.g., to the purchaser or a designated recipient), track transactions associated with the pre-paid instrument and remaining value associated with the pre-paid instrument. Further, pre-paid payment system 104 is operable to track an expiration time associated with the pre-paid instrument and automatically return un-used value to the purchaser at the time for expiration.

Retailers 106a and 106b can include general on-line retail presences or brick and mortar presences. In some implementations, the pre-paid payment instruments issued by the pre-paid payment system 104 are redeemable only at a select number or type of retailer. Alternatively, the pre-paid payment instrument can be guaranteed and be accepted as currency at a large, potentially unlimited number of retailers 106.

Figure 2:
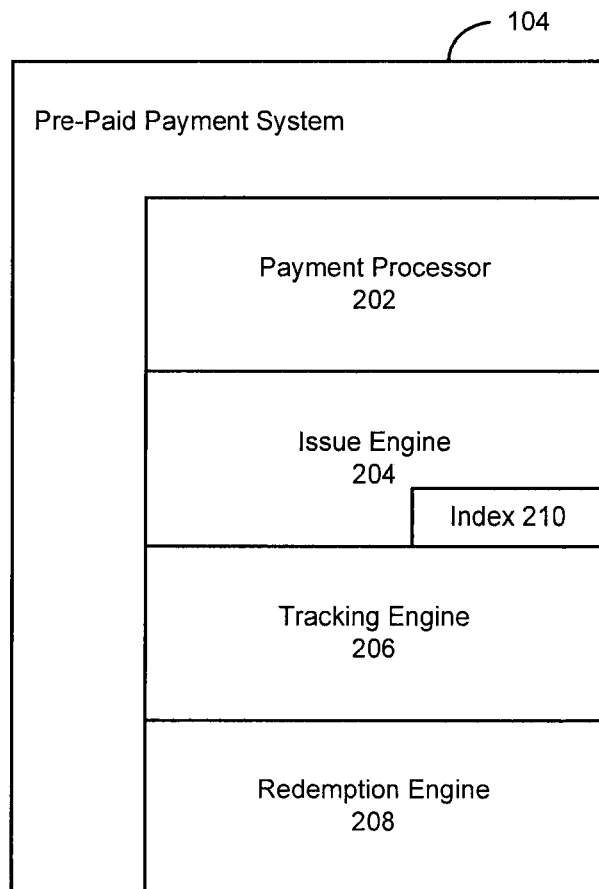
FIG. 2 is a block diagram of an example pre-paid payment system.

Referring to FIG. 2, in some implementations, the pre-paid payment system 104 includes a payment processor 202, an issue engine 204, a tracking engine 206 and a redemption engine 208. In one implementation, the pre-paid payment system 104 is embodied in a server that interacts with one or more client devices associated with purchasers, designated recipients and retailers associated with the system. One or more of the components of the pre-paid payment system can be co-located or embodied in a single of several server devices.

Payment processor 202 is operable for receiving and processing payments for pre-paid payment instruments. Payment processor 202 can include a user interface that can be presented to a purchaser to allow for entry of payment information. Further, the user interface (not shown) can be used to provide information to and from purchasers, prospective purchasers and designated recipients. For example, payment processor 202 can, as would be expected, accept payment information from a given purchaser. The payment information can be of the form of a credit card number, an electronic check, a check, or other form of payment. Payment processor 202 can interact with one or more external systems to verify the integrity of the payment, and upon authentication, can initiate the issuance of a pre-paid payment instrument to the purchaser or their designated recipient.

In some implementations, payment processor 202 can be used to receive other information from the purchaser. In some implementations, the purchaser may specify when a pre-paid payment instrument will expire and what to do with any un-used value associated therewith. In one implementation, the purchaser can elect to enable an automatic refund feature. In other implementations, the purchaser can elect a time period for expiration (e.g., from a pre-determined set of possible expiration dates) that can be triggered upon a predetermined event (e.g., the purchase of the instrument, the first transactional use of the instrument, a fixed number of days, the last purchase transaction, etc.). At expiration, any un-used portion of a pre-paid payment instrument can be credited back to the purchaser and the instrument can be invalidated. In some implementations, a re-stocking fee can be charged by the pre-paid payment system 104 for performing the automatic credit. The re-stocking fee can be a fixed amount or proportional to the amount that is credited. In one implementation, the re-stocking fee has a minimum value. In such an implementation, no re-stocking will result if the value remaining is less than the minimum. In some implementations, payment processor 202 receives payment from a purchaser for the pre-payment instrument and issues the pre-payment instrument to the purchaser. Alternatively, payment processor 202 can issue the pre-payment mechanism to a third party (e.g., in the form or a gift).

A issue engine 204 is operable for issuing pre-paid payment instruments to purchasers and designated recipients. The issue engine 204 can include a rendering engine (not shown) that renders a payment mechanism. For example, the pre-paid payment instrument can be of the form of a coupon, and the issue engine 204 can render a coupon of the proscribed value (with any limitations printed therein including, for example, value, unique identifier, expiration date, etc.). The issue engine 204 can communicate with a user device 103 to present the pre-paid payment mechanism to the user. The user device 103 can be of the form of personal computer or a point of sale terminal, and the issue engine 204 can communicate with the user device to provide a pre-paid payment instrument to the purchaser 102 or designated recipient 112. For example, a point of sale terminal can be used to swipe a gift card that can have detailed thereon (either electronically or otherwise) the proscribed value. In another implementation, the user device 103 can have an associated printer and the issue engine 204 can render an image of a coupon that can be printed on the user device 103 for delivery to the purchaser or designated recipient. Other forms of delivery are possible.

Issuance includes the association of an identifier attributable to the pre-paid value instrument and a value. In one implementation, the issue engine 204 includes an index 210 of identifiers and associated values that can be used by the tracking engine 206 to authorize transactions and redemptions as required. The index 210 can be of the form of a database that is accessible by the issue engine 204 and the tracking engine 206. Other payment systems can have access to the index 210 as required. The index 210 can be integrated with the issue engine 204 or a separate functional block co-located or remote from the issue engine 204. The index 210 can be of the form of a database. Data residing therein can be secured by conventional means. In a simple form, issue engine 204 is operable to issue a pre-paid value card or coupon to the purchaser or designated recipient upon successful processing of a payment by the payment processor 202.

Tracking engine 206 is operable to determine a time of issuance for each pre-paid payment instrument and a time of expiration of the same. Tracking engine 206 can interact with any of a number of third party systems including those disposed between the pre-paid payment system 104 and the retailers 106. Alternatively or in addition, tracking engine 206 can interact with retailers 106 at each requested transaction. In some implementations, the tracking engine 206 is operable to track purchases made with the pre-paid payment instrument prior to an expiration time. A given transaction request can be received by the tracking engine 206. The request can be processed by locating an appropriate value associated with a given pre-paid payment instrument as stored in the index 210. Tracking engine 206 can authorize payments and deduct appropriate amounts from the value. In addition, tracking engine 206 can include a timer 220. The timer 220 can be used to track an expiration time associated with a given pre-paid payment instrument. In one implementation, also stored in the index 210, are one or more expiration criteria and/or a timer. The expiration criteria can be used to determine when to start the timer (e.g., when purchase is made, at a first redemption, a predetermined number of days, a predetermined number of transactions, after a predetermined number of failed transactions, after a predetermined idle period, a predetermined number of days after a last transaction, etc.). A given timer can determine the amount of time (e.g., or number of transactions) to allow prior to expiring the pre-paid payment instrument. Expiration is discussed in greater detail below.

In some implementations, the tracking engine 206 is operable to provide tracking information to the purchaser, designated recipient or both based on the transactions. For example, tracking engine 206 can be used to provide a notification to the purchaser of receipt, printing, and redemption of an issued pre-paid payment instrument (e.g., coupon).

Redemption engine 208 is operable to automatically return unused value to purchasers of pre-paid payment instruments at a time of expiration of same. In one implementation, a purchasers original form of payment is credited at the time of expiration. For example, if a purchaser used a checking account to provide the funds to purchase the pre-paid payment instrument, then the same checking account can be credited the un-used funds at the time of expiration. In one implementation, a re-stocking fee is deducted from the available value prior to the credit. In one implementation, if insufficient value is available to satisfy the re-stocking fee, then no credit is returned to the original purchaser. In some implementations, the re-stocking fee is proportional to the available funds, and accordingly, value is always returned to the purchaser.

In one implementation, the payment processor 202, issue engine 204, tracking engine 206 and redemption engine 208 are included in a server portion of the system. The system further can include a client portion. The client portion can be of the form of the user device (e.g., user device 103) and be operable to receive the pre-paid payment instrument from the server portion and print the pre-paid payment instrument for use by the purchaser or designated recipient.

Figure 3:
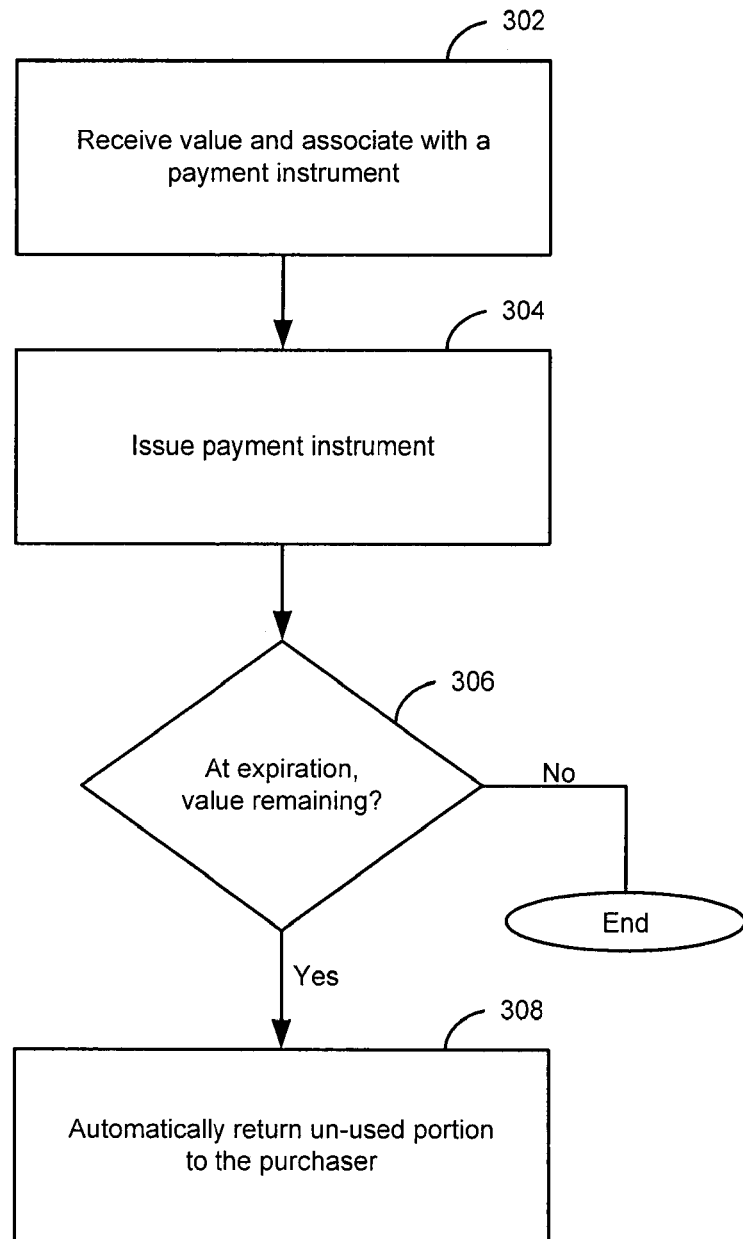
FIG. 3 is a flow diagram of an example process for issuing pre-paid payment mechanisms.

Referring now to FIG. 3, a method for providing a pre-paid payment instrument to a purchaser or designated recipient is described. The method can be performed by, for example, a combination of the pre-paid payment system 104 and user device 103 described above. At stage 302, a value is received, from a sending party, and associated with a payment instrument. The value can be of the form of a monetary value (e.g. currency), transferred from a purchaser to, for example payment processor 202. The payment instrument can be of the form of a coupon, a gift card, a pre-paid value card, a pre-paid services card, etc.

At stage 304, the payment instrument having the associated value is issued. Issuance can include printing of the payment instrument on a user device 103 associated with a purchaser 102. Issuance can as well include recording the value and an identifier associated with the payment instrument in an index (e.g. index 210) that can be evaluated. Issuance can as well trigger the start of a timer. In some implementations issuance includes determining a time of expiration for the payment instrument. The time can be set by the purchaser, by agreement, default or otherwise. Issuance can include the activation of the payment instrument or printing of the payment instrument by, for example, user device 103.

At stage 306, a determination is made if the value has been used prior to the expiration of a predetermined period of time (e.g., the expiration time). For example, a tracking engine 206 can track the remaining value as well as determine if the expiration time has arrived. For example, determining if the value has been used includes determining if a receiving party of the payment instrument has expended all of the value in one or more transactions prior to the expiration date, by for example, tracking engine 206.

At stage 308, if value remains on the payment instrument at the time of expiration, the unused value is automatically returned to the sending party. For example, the tracking engine 206 can signal the redemption engine 208 at the time of the expiration of the payment instrument. In turn, the redemption engine 208 can determine the value that remains (e.g., based on the index 210), and credit some or all of the value back to the original purchaser or in accordance with any redemption criteria specified by the purchaser or the system. Returning the unused portion of value can include returning the unused portion to the sending party less a restocking fee.

Figure 4:
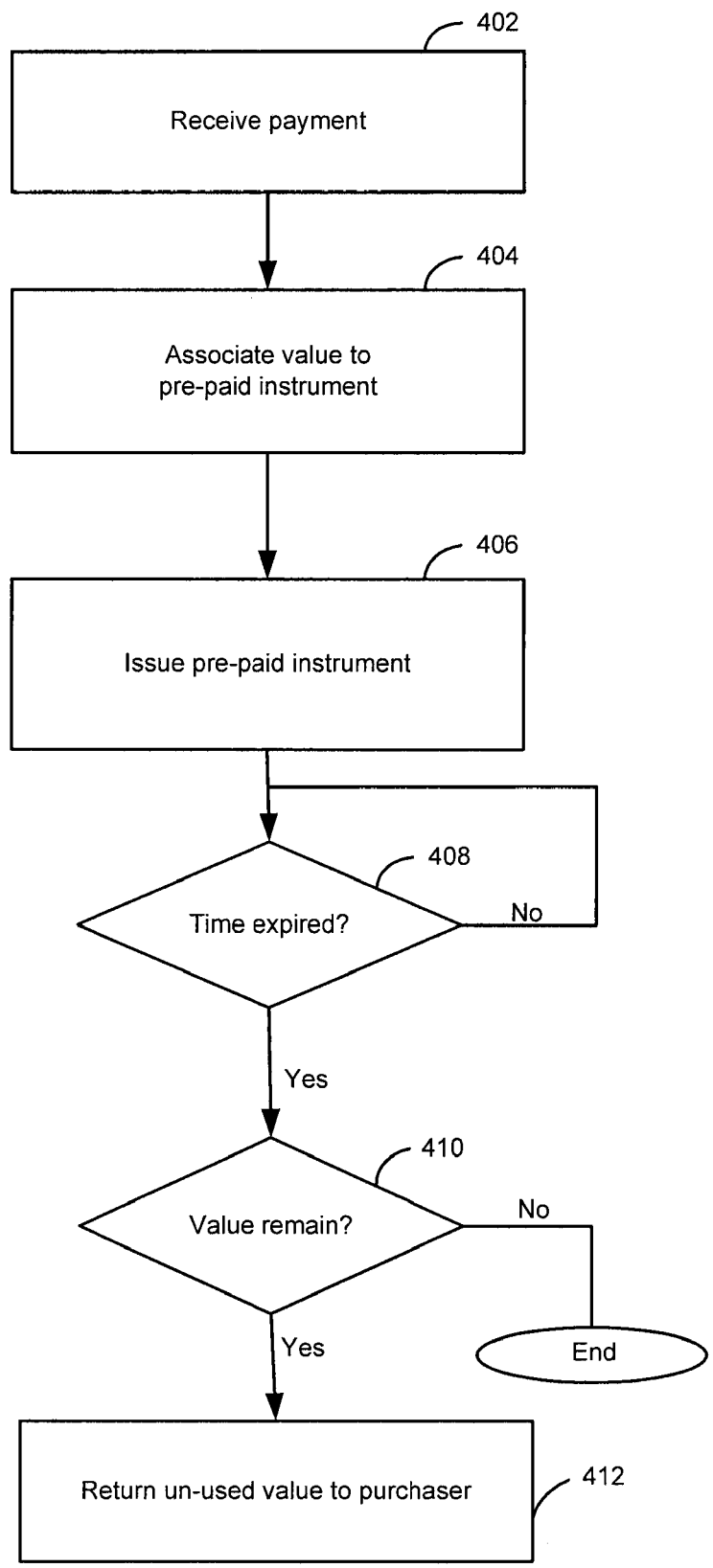
FIG. 4 is another flow diagram of an example process for issuing pre-paid payment mechanisms.

Referring now to FIG. 4, a method of providing a pre-paid payment instrument to a purchaser is provided. The method can be performed by the pre-paid payment system 104 discussed above.

At stage 402, a payment is received from a purchaser for a pre-paid payment instrument. The payment can be received and processed at the payment processor 202. At stage 404, a value is associated to the pre-paid payment instrument, the value being attributable to the payment. In some implementations, the value can be less than the payment amount received, reflecting the cost (i.e., charge) for purchasing the pre-payment instrument. The pre-payment instrument can be of the form of a coupon, a gift card, a pre-paid services card, a pre-paid gift card, and the like. Value assignment and storage of the value information can be performed by the issue engine 204 in, for example index 210.

At stage 406, the pre-paid payment instrument is issued, e.g., by the issue engine 204 to the purchaser or a designated recipient. Thereafter use of the pre-paid payment mechanism is tracked. Tracking can include debiting value and checking expiration of the payment instrument. Tracking can be performed by tracking engine 206. At stage 408, a determination is made as to whether a pre-determined time has expired associated with the pre-paid payment instrument (e.g., by tracking engine 206). At stage 410, if the pre-determined time has expired, a determination is made as to whether a portion of the value remains associated with the pre-paid payment instrument (e.g., by tracking engine 206). At stage 412, if a portion of value remains, the portion of value is automatically returned to the purchaser (e.g., by the redemption engine 208). In some implementations, if a value is returned, then stage 412 can include invalidating the pre-paid payment instrument.

Figure 5:
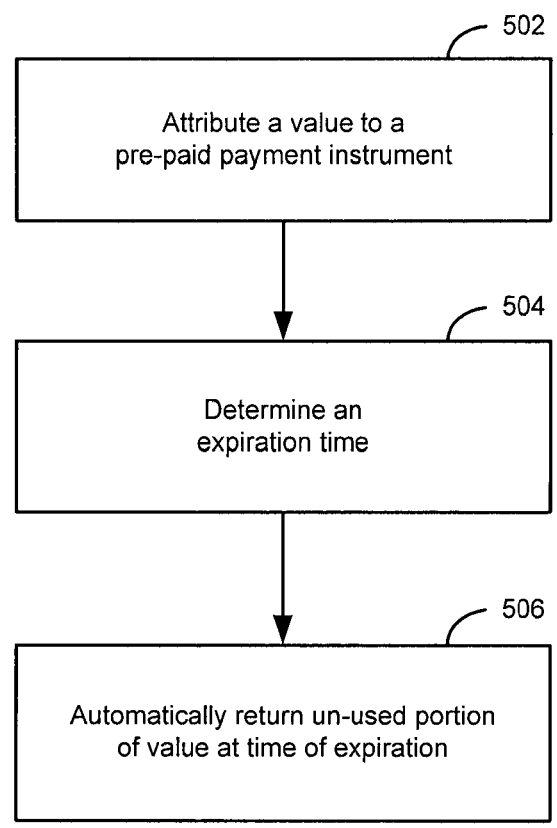
FIG. 5 is another flow diagram of an example process for issuing pre-paid payment mechanisms.

Referring to FIG. 5, another method is provided for managing a pre-paid payment instrument is provided. At stage 502, a value is attributed to a pre-paid payment instrument. At stage 504, an expiration time associated with the pre-paid payment instrument is determined. At the expiration time (stage 506), an un-used portion of value associated with the pre-paid payment instrument is automatically returned to a purchaser. The method can optionally include the further steps of issuing, the pre-paid payment instrument to a party providing the value or a designated party; printing the pre-paid instrument; and automatically crediting an account associated with a party providing the value for the un-used portion at the expiration time.

Figure 6:
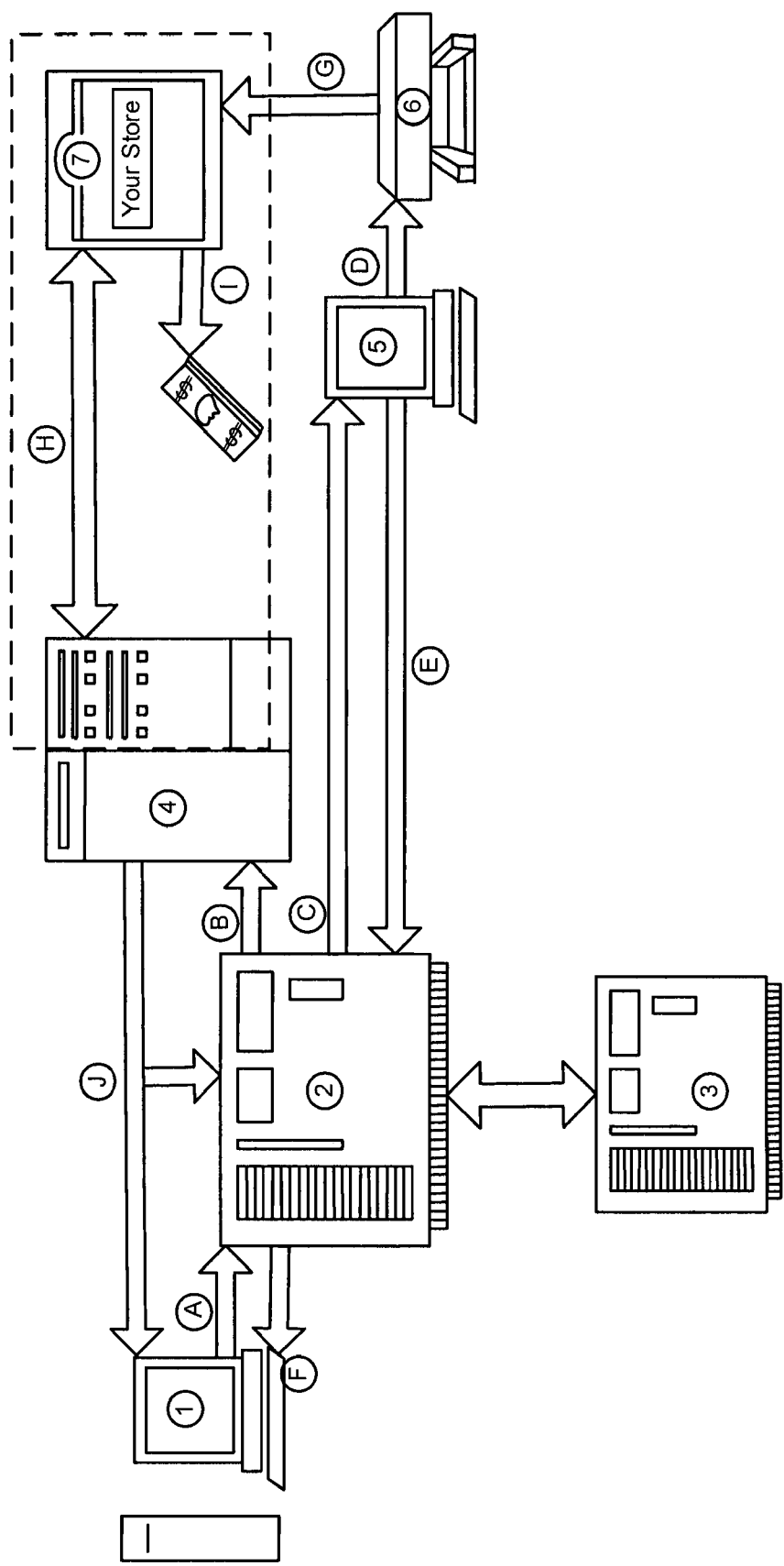
FIG. 6 is an example process flow for a pre-paid transaction.

Referring to FIG. 6, an example process flow is shown for a pre-paid transaction. A sender visits a website (1) and enters payment information (e.g., credit card information) and recipient information which is transmitted to (A) a pre-paid payment system (2). The sender's payment is authorized (e.g., credit card is charged) by for example a third party (3) and funds are deposited. The system (2) transmits (B) a unique record identifier and associated value to an authentication system (e.g., an external third party authentication system or one associated with the system (2)) (4). Notifications can be provided to the recipient (e.g., emails) (C). The recipient (5) receives the notification and prints (D) using a printer (6) a unique authentication certificate (e.g., coupon). The system (2) receives notice of the printing (E) and can notify the purchaser (F). The recipient can use the certificate at a redemption point (G). A redemption system validates the certificate (H) against the authentication system (4). Payment is then made to the recipient (I) or the retailer/redemption site. Notice of redemption (J) is provided to the system (2) and to the sender (1).

Implementations of the subject matter and the functional operations described in this specification can be implemented in digital electronic circuitry, or in computer software, firmware, or hardware or combinations thereof, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program; software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server (or more particularly in this application a value and expiration tracker), or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method for administering a pre-paid payment instrument, the method comprising:
   providing a pre-paid payment system implemented on one or more servers, the pre-paid payment system including a tracking engine and a redemption engine;
   providing, by the pre-paid payment system, a website accessible by a purchaser via a purchaser device using a web browser, the website including a user interface enabling the purchaser to enter a value, payment information, recipient information, and to select a time for a refund determination;
   receiving, by the pre-paid payment system from the purchaser via the purchaser device, the value, payment information recipient information, and the selected time;
   associating, by the pre-paid payment system, a unique identifier and the value with the pre-paid payment instrument;
   setting, by the tracking engine on the occurrence of a predetermined trigger event, a timer to track a refund determination time for the pre-paid payment instrument, the refund determination time being based on the selected time received from the purchaser and the predetermined trigger event;
   signaling, by the tracking engine upon the timer reaching the refund determination time, the redemption engine;
   determining, by the redemption engine in response to being signaled by the tracking engine, whether any amount of the value associated with the pre-paid payment instrument remains unused; and
   automatically returning, by the redemption engine in response to finding an unused amount of the value remains on the pre-paid instrument, at least a portion of the unused amount to the purchaser in accordance with predetermined redemption criteria.

2. The method of claim 1, further comprising indexing the unique identifier and the value associated with the pre-paid payment instrument in a database.

3. The method of claim 2, further comprising authorizing a transaction performed by the recipient using the pre-paid payment instrument.

4. The method of claim 1, further comprising tracking, by the tracking engine, transactions performed by the recipient using the pre-paid payment instrument.

5. The method of claim 4, further comprising sending, by the tracking engine, notifications to the purchaser via the purchaser device of the transactions performed by the recipient using the pre-paid payment instrument.

6. The method of claim 1, wherein at least a portion of the predetermined redemption criteria is received by the payment processor from the purchaser device with the value, payment information, recipient information, and the selected time.

7. The method of claim 1, wherein the payment information includes one of a credit card number or an electronic check.

8. The method of claim 1, further comprising sending the payment information to a third party for authorization of payment.

9. The method of claim 1 wherein the timer starts when the pre-paid payment instrument is purchased by the purchaser.

10. The method of claim 1, wherein the timer starts when the recipient performs a first transaction using the pre-paid payment instrument.

11. The method of claim 1, wherein the timer starts following a predetermined idle period.

12. The method of claim 1, further comprising issuing, by an issue engine and based on the recipient information received from the purchaser device, a representation of the pre-paid payment instrument to a recipient via a recipient device.

* * * * *